United States Patent
Baika

(10) Patent No.: US 8,808,932 B2
(45) Date of Patent: Aug. 19, 2014

(54) FUEL CELL SYSTEM

(75) Inventor: Toyokazu Baika, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1159 days.

(21) Appl. No.: 12/304,305

(22) PCT Filed: Jul. 12, 2007

(86) PCT No.: PCT/JP2007/063913
§ 371 (c)(1),
(2), (4) Date: Dec. 11, 2008

(87) PCT Pub. No.: WO2008/007741
PCT Pub. Date: Jan. 17, 2008

(65) Prior Publication Data
US 2009/0253021 A1    Oct. 8, 2009

(30) Foreign Application Priority Data

Jul. 12, 2006 (JP) ................................. 2006-191557

(51) Int. Cl.
*H01M 8/06* (2006.01)

(52) U.S. Cl.
USPC ........................... 429/410; 429/408; 429/444

(58) Field of Classification Search
USPC ......... 429/12, 22, 34, 90, 400, 408, 410, 443, 429/444; 73/31.02; 96/111
See application file for complete search history.

(56) References Cited

U.S. PATENT DOCUMENTS

| | | | | |
|---|---|---|---|---|
| 5,138,869 A | * | 8/1992 | Tom | 73/31.03 |
| 5,916,438 A | * | 6/1999 | Trocciola et al. | 210/188 |
| 2002/0150806 A1 | * | 10/2002 | Stenersen et al. | 429/34 |
| 2003/0064271 A1 | * | 4/2003 | Stenersen | 429/34 |
| 2004/0157095 A1 | | 8/2004 | Bruck et al. | |
| 2006/0035120 A1 | * | 2/2006 | Sakai | 429/22 |
| 2007/0157815 A1 | * | 7/2007 | Arai et al. | 96/108 |

FOREIGN PATENT DOCUMENTS

| | | | | |
|---|---|---|---|---|
| JP | 11-226341 | | 8/1999 | |
| JP | 2001-13048 | | 1/2001 | |
| JP | 2001-149921 | | 6/2001 | |
| JP | 2003-103264 | | 4/2003 | |
| JP | 2003-132928 | | 5/2003 | |
| JP | 2004055260 A | * | 2/2004 | H01M 8/04 |
| JP | 2004-152669 | | 5/2004 | |
| JP | 2004-526277 | | 8/2004 | |
| JP | 2005-116353 | | 4/2005 | |
| JP | 2006-179332 | | 7/2006 | |

* cited by examiner

*Primary Examiner* — Carlos Barcena
(74) *Attorney, Agent, or Firm* — Finnegan, Henderson, Farabow, Garrett & Dunner, LLP

(57) ABSTRACT

A fuel cell system having an adsorber placed in an air supply path to an air electrode of a fuel cell and receiving a chemical filter for adsorbing impurities contained in air; measurement means for measuring the amount per unit time of air having passed the adsorber; detection means for detecting the density of impurities contained in the air, whose volume has been measured by the measurement means, before it enters the adsorber; estimation means for estimating, based on the amount of the air, the density of the impurities, and adsorption efficiency of the chemical filter, the amount of the impurities adsorbed per unit time by the chemical filter; and output control means for causing a signal to output when an accumulated value of the amount of the impurity exceeds a predetermined level.

12 Claims, 4 Drawing Sheets

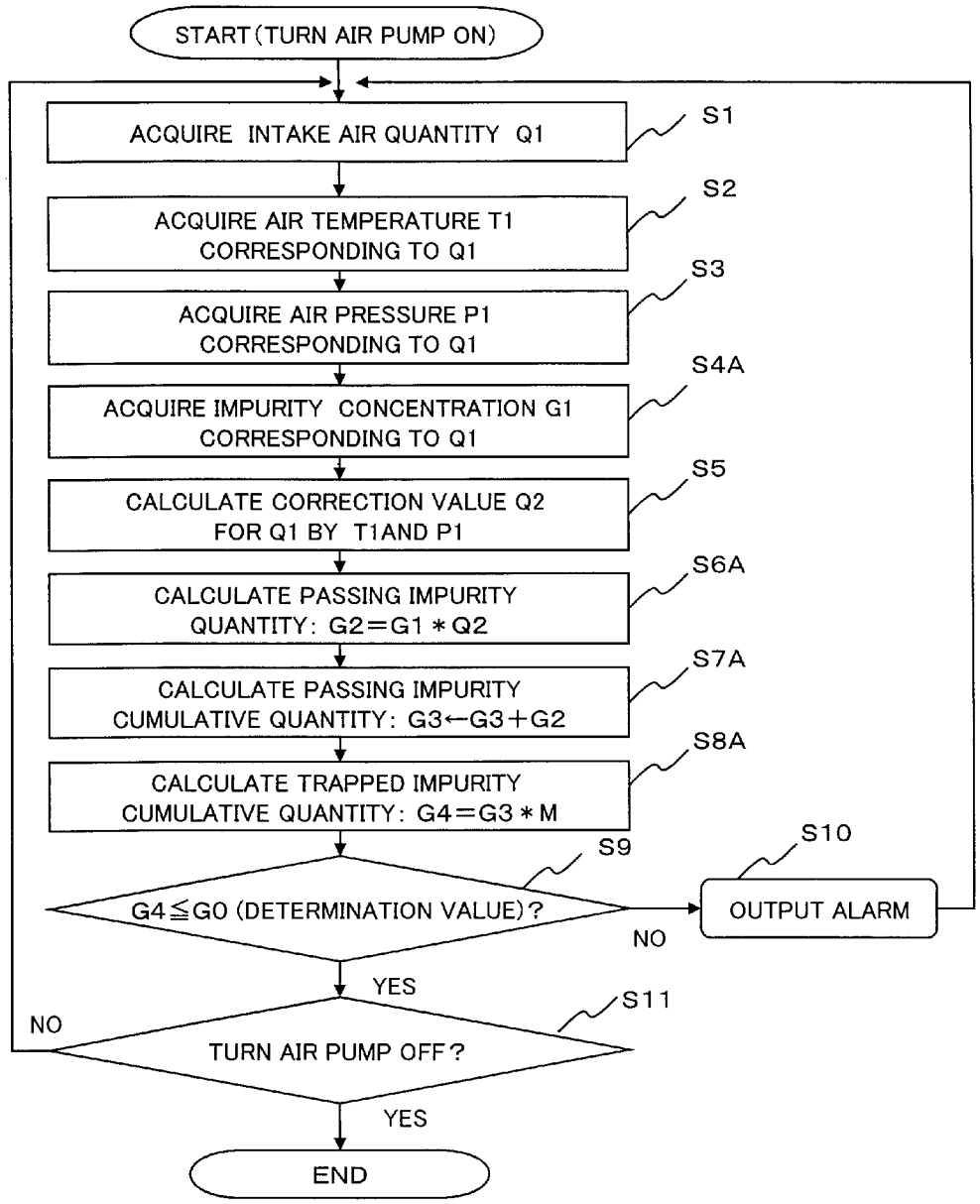

FUEL CELL SYSTEM

CROSS-REFERENCE TO RELATED APPLICATIONS

This application is a national phase application of International Application No. PCT/JP2007/063913, filed Jul. 12, 2007, and claims the priority of Japanese Application No. 2006-191557, filed Jul. 12, 2006, the contents of both of which are incorporated herein by reference.

TECHNICAL FIELD

The present invention relates to a fuel cell system.

BACKGROUND ART

In order to remove an impurity component harmful to a fuel cell, such as a sulfur compound (for example, $SO_2$ or $H_2S$) or a nitrogen oxide (NOx), from air supplied as an oxidizer gas to an air electrode of the fuel cell, there is employed a chemical filter placed on a supply path of the oxidizer gas to the fuel cell. The chemical filter includes activated carbon and the like, and adsorbs the impurity component onto the chemical filter to remove the impurity component.

For determination of a lifetime of the chemical filter, for example, there is employed a filter lifetime determination system for the fuel cell, involving: obtaining a quantity of an adsorbed impurity per unit time, which is adsorbed onto the chemical filter, based on information of a self-vehicle under a running environment, including a standard impurity concentration at a running position of the self-vehicle and an average velocity of the self-vehicle; integrating the obtained quantity of the adsorbed impurity per unit time over a running time to obtain a total quantity of the impurity adsorbed onto the chemical filter; determining whether or not the total quantity of the adsorbed impurity exceeds a predetermined value; and judging that the chemical filter is at the end of its lifetime when the total quantity of the adsorbed impurity exceeds the predetermined value (for example, Patent Document 1).

Patent Document 1: JP 2004-152669 A
Patent Document 2: JP 2003-132928 A
Patent Document 3: JP 11-226341 A

DISCLOSURE OF THE INVENTION

Problem to be Solved by the Invention

The technology of Patent Document 1 has the following problem. In the technology of Patent Document 1, an average velocity V1 of the self-vehicle per unit time is obtained. From a correlation equation between the average velocity V1 and a concentration, a velocity coefficient V2 is obtained. A standard nitrogen oxide concentration N1 is multiplied by the velocity coefficient V2 to obtain a quantity of an adsorbed nitrogen oxide ΔX1 per unit time. The velocity coefficient V2 is defined to decrease as the average velocity V1 increases.

In an actual vehicle running environment, however, a load on the vehicle (fuel cell) sometimes becomes larger in spite of a low velocity, as in the case where the vehicle runs uphill. In this case, since a quantity of air to be supplied to the fuel cell (intake air quantity of an air compressor for supplying the air to the fuel cell) also increases, it is believed that a quantity of the impurity in the intake air also increases. In this manner, the intake air quantity is not uniquely determined by the running velocity. Therefore, there is a possibility that a large error may be generated between a calculated quantity of adsorption and an actual quantity of adsorption.

An object of the present invention is to provide a technology enabling the estimation of the quantity of the impurity adsorbed onto the chemical filter with good accuracy as compared with conventional ones.

Means for Solving the Problem

The present invention adopts the following configuration to solve the above-mentioned problem.

Specifically, the present invention provides a fuel cell system including:

an adsorber placed on an air supply path to an air electrode of a fuel cell, the adsorber housing a chemical filter for adsorbing an impurity contained in air;

a measurement unit to measure an air quantity having passed through the adsorber per unit time;

a detection unit to detect a concentration of the impurity contained in air of the air quantity measured by the measurement unit when the air enters the adsorber;

an estimation unit to estimate a quantity of the impurity adsorbed onto the chemical filter per unit time based on the air quantity, the concentration of the impurity, and an adsorption efficiency of the chemical filter; and an output control unit to allow a signal to be output when a cumulative value of the quantity of the impurity exceeds a predetermined value.

Further, the present invention provides an adsorption quantity estimating apparatus for a chemical filter in a fuel cell system, including:

a unit to acquire an air quantity having passed through an adsorber per unit time, the adsorber being placed on an air supply path to an air electrode of a fuel cell and housing the chemical filter for adsorbing an impurity contained in air;

a unit to acquire a concentration of the impurity contained in air of the air quantity acquired by the air quantity acquiring unit when the air enters the adsorber; and an estimation unit to estimate a quantity of the impurity adsorbed onto the chemical filter per unit time based on the air quantity, the concentration of the impurity, and an adsorption efficiency of the chemical filter.

Further, the present invention is realized as a program causing a computer to execute the steps of:

measuring an air quantity having passed through an adsorber per unit time, the adsorber being placed on an air supply path to an air electrode of a fuel cell and housing a chemical filter for adsorbing an impurity contained in air;

acquiring a concentration of the impurity contained in air of the air quantity measured by the measuring step when the air enters the adsorber;

estimating a quantity of the impurity adsorbed onto the chemical filter per unit time based on the air quantity, the concentration of the impurity, and an adsorption efficiency of the chemical filter; and allowing a signal to be output when a cumulative value of the quantity of the impurity exceeds a predetermined value.

According to the present invention, the adsorption quantity is obtained from the air quantity having passed through the adsorber, the impurity concentration in the air before entering the adsorber, and the adsorption efficiency of the chemical filter. Therefore, the adsorption quantity and its cumulative value can be estimated with good accuracy as compared with conventional ones.

Here, the adsorption efficiency of the chemical filter indicates a ratio of the impurity adsorbed onto the chemical filter to the impurity passing through the adsorber per unit quantity.

Further, the present invention provides a fuel cell system including:

an adsorber placed on an air supply path to an air electrode of a fuel cell, the adsorber housing a chemical filter for adsorbing an impurity contained in air;

a measurement unit to measure an air quantity having passed through the adsorber per unit time;

a detection unit to detect a concentration of the impurity contained in air of the air quantity measured in the measurement unit;

an estimation unit to estimate a quantity of the impurity adsorbed onto the chemical filter per unit time based on the air quantity, the concentration of the impurity, and an adsorption efficiency of the chemical filter; and an output control unit to allow a signal to be output when a cumulative value of the quantity of the impurity exceeds a predetermined value.

Further, the present invention provides an adsorption quantity estimating apparatus for a chemical filter in a fuel cell system, including:

a unit to acquire an air quantity having passed through an adsorber per unit time, the adsorber being placed on an air supply path to an air electrode of a fuel cell and housing the chemical filter for adsorbing an impurity contained in air;

a unit to acquire a concentration of the impurity contained in air of the air quantity acquired by the air quantity acquiring unit; and an estimation unit to estimate a quantity of the impurity adsorbed onto the chemical filter per unit time based on the air quantity, the concentration of the impurity, and an adsorption efficiency of the chemical filter, the adsorption efficiency being stored in a storage.

Further, the present invention is realized as a program causing a computer to execute the steps of:

measuring an air quantity having passed through an adsorber per unit time, the adsorber being placed on an air supply path to an air electrode of a fuel cell and housing a chemical filter for adsorbing an impurity contained in air;

acquiring a concentration of the impurity contained in air of the air quantity measured by the measuring step;

estimating a quantity of the impurity adsorbed onto the chemical filter per unit time based on the air quantity, the concentration of the impurity, and an adsorption efficiency of the chemical filter; and allowing a signal to be output when a cumulative value of the quantity of the impurity exceeds a predetermined value.

The present invention is realized as the invention of an adsorption quantity estimating method having similar features to those of the fuel cell system and the adsorption quantity estimating apparatus described above. Moreover, the present invention is also realized as a recording medium which records the above-mentioned programs.

Effects of the Invention

According to the present invention, a technology which enables the estimation of the quantity of the impurity adsorbed onto the chemical filter with good accuracy as compared with conventional ones can be provided.

BRIEF DESCRIPTION OF THE DRAWINGS

FIG. 4 is a flowchart illustrating an example of the lifetime determination processing for the chemical filter by the ECU.

DESCRIPTION OF REFERENCE NUMERALS

Figure 1:
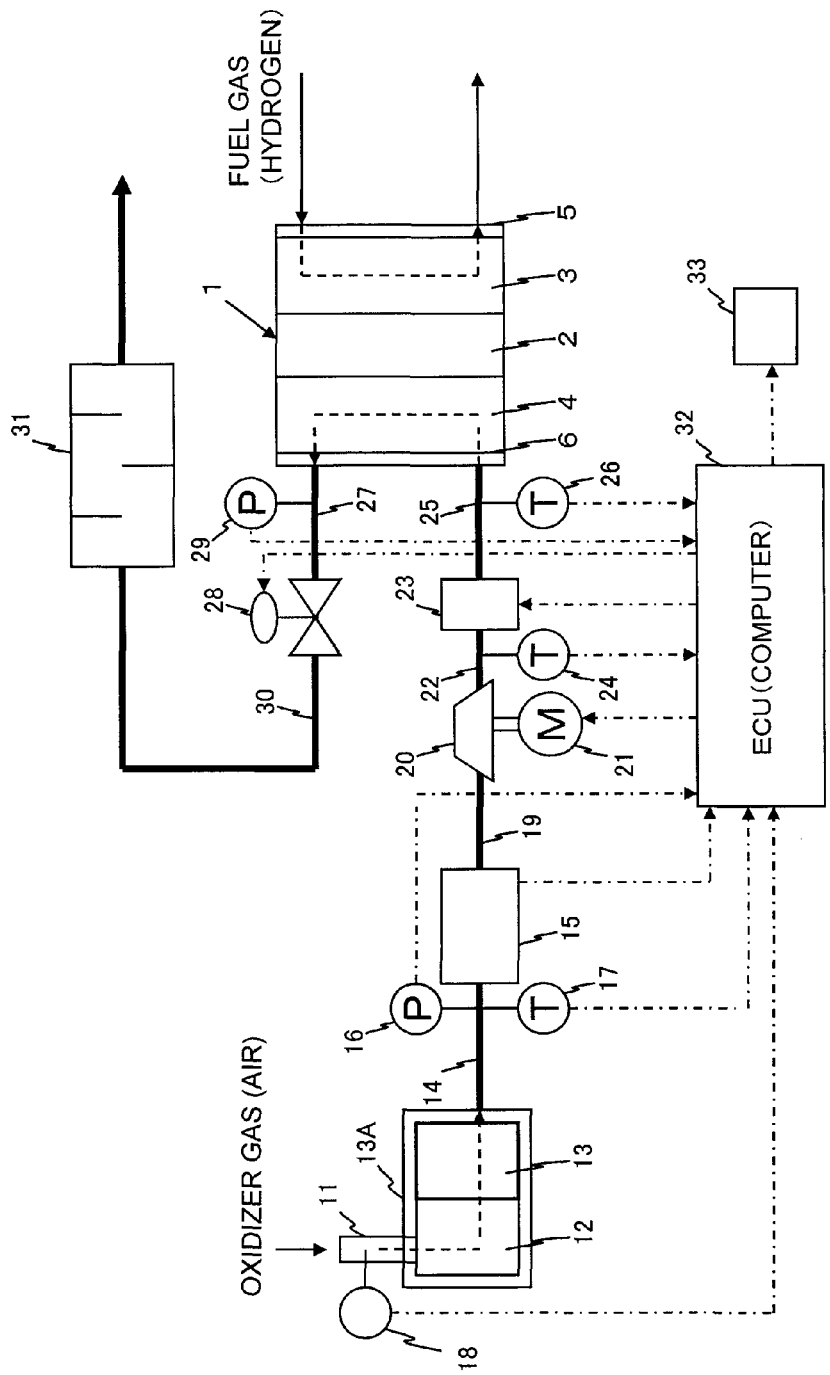
FIG. 1 is an explanatory view illustrating a configuration example of a fuel cell system according to a first embodiment of the present invention.

1 . . . fuel cell
2 . . . polymer electrolyte membrane
3 . . . fuel electrode
4 . . . air electrode
5 . . . fuel electrode side separator
6 . . . air electrode side separator
11 . . . air intake tube
12 . . . dust filter
13 . . . chemical filter
14, 19, 22, 25, 27, 30 . . . pipe
15 . . . air flow meter
16, 29 . . . pressure sensor
17, 24, 26 . . . temperature sensor
18, 18A . . . concentration sensor
20 . . . air pump
21 . . . motor
23 . . . intercooler
28 . . . regulator
31 . . . muffler
32 . . . ECU
33 . . . warning lamp

BEST MODE FOR CARRYING OUT THE INVENTION

Hereinafter, embodiments of the present invention are described referring to the drawings. The configuration of the embodiments is given only by way of example, and therefore, the present invention is not limited to the configuration of the embodiments.

First Embodiment

FIG. 1 is a view illustrating a configuration example of a fuel cell system according to a first embodiment of the present invention. The fuel cell system is mounted in a mobile object (for example, vehicle). As a fuel cell 1 shown in FIG. 1, a polymer electrolyte fuel cell (PEFC) is adopted. The fuel cell 1 includes a cell stack constituted by stacking a plurality of cells (in FIG. 1, however, a structure of a single cell in the fuel cell 1 is schematically illustrated).

Each of the plurality of cells includes a polymer electrolyte membrane 2, a fuel electrode (anode) 3 and an air electrode (oxidizer electrode; cathode) 4 which sandwich the polymer electrolyte membrane 2 from both sides thereof, and a fuel electrode side separator 5 and an air electrode side separator 6 which sandwich the fuel electrode 3 and the air electrode 4.

The fuel electrode 3 includes a diffusion layer and a catalytic layer. A fuel (fuel gas) containing hydrogen such as a hydrogen gas or a hydrogen rich gas is supplied to the fuel electrode 3 by a fuel supply system. The fuel gas supplied to the fuel electrode 3 is diffused in the diffusion layer to reach the catalytic layer. In the catalytic layer, hydrogen contained in the fuel gas is separated into protons (hydrogen ions) and electrons. The hydrogen ions pass through the polymer electrolyte membrane 2 to move to the air electrode 4, whereas the electrons pass through an external circuit (not shown) to move to the air electrode 4.

On the other hand, the air electrode 4 includes a diffusion layer and a catalytic layer. Air serving as an oxidizer gas is supplied to the air electrode 4 by an oxidizer supply system. The air supplied to the air electrode 4 is diffused in the diffusion layer to reach the catalytic layer. In the catalytic layer, water is generated by a reaction between the air, the hydrogen ions having passed through the polymer electrolyte membrane 2 to reach the air electrode 4, and the electrons having passed through the external circuit to reach the air electrode 4.

The electrons passing through the external circuit upon the reactions in the fuel electrode 3 and the air electrode 4 as described above are used as electric power for a load connected between both terminals of the fuel cell 1.

In FIG. 1, an oxidizer gas flow path through the air electrode 4 of the fuel cell 1 is illustrated. The oxidizer gas flow path is constituted by the air electrode 4 of the fuel cell 1, an oxidizer supply system (air supply path) provided on the upstream side of the air electrode 4, and an oxidizer discharge system provided on the downstream side of the air electrode 4.

In FIG. 1, the oxidizer supply system (air supply path) includes a dust filter 12 through which outside air (air) taken through an air intake tube 11 and a chemical filter 13 placed on the downstream side of the dust filter 12. An inlet of the air intake tube 11 is placed to be open toward an outside air intake port provided to the vehicle. Further, a concentration sensor 18 in provided to the air intake tube 11. The concentration sensor 18 detects a concentration of a specific type of impurity contained in the air introduced into a housing container 13A (adsorber). Air containing a gas (gaseous), liquid, or solid (granular or powdery) impurity component (sulfur compound (for example, $SO_2$ or $H_2S$), nitrogen oxide (NOx), or the like) is taken into the air intake tube 11.

The dust filter 12 removes a granular substance in the air. The chemical filter 13 includes activated carbon or the like and adsorbs the impurity component (sulfur compound (for example, $SO_2$ or $H_2S$), nitrogen oxide (NOx), or the like) contained in the air onto itself to remove the impurity component.

The dust filter 12 and the chemical filter 13 are constituted as a single unit including the two. In an example illustrated in FIG. 1, the configuration is as follows. The dust filter 12 and the chemical filter 13 are housed within the housing container 13A in which the air intake tube 11 and a pipe 14 are connected to be in communication with each other. After the air introduced from the air intake tube 11 into the housing container 13A passes through the dust filter 12, the air passes through the chemical filter 13 to be fed into the pipe 14. The housing container 13A functions as an adsorber housing the chemical filter therein.

In the housing container 13A, the dust filter 12 and the chemical filter 13 may be placed to be in contact with each other or may be placed to be spaced away from each other. The dust filter 12 and the chemical filter 13 may be provided in different housing containers. In this case, the two housing containers may be configured to be integrally formed to bring the inner spaces of the respective housing containers into communication with each other or to bring the inner spaces of the respective housing containers into communication with each other through an inner space of a pipe. The chemical filter 13 in the housing container may be placed to allow the air introduced into the container to pass therethrough or may be placed to allow the air to pass through the container while the air is in contact with the chemical filter 13.

The air having passed through the chemical filter 13 is sucked into an air flow meter 15 connected to the pipe 14 through the pipe 14. A pressure sensor 16 for detecting a pressure (air pressure) in the pipe 14 and a temperature sensor 17 for detecting a temperature (air temperature) in the pipe 14 are provided to the pipe 14.

The air flow meter 15 measures an intake air quantity (air quantity passing through itself). The air having passed through the air flow meter 15 is introduced to an air pump (air compressor) 20 connected through a pipe 19. The air pump 20 is operated by driving of a motor 21 to feed the air to the fuel cell 1 side. The air pump 20 is connected to an intercooler 23 through a pipe 22. The air fed from the air pump 20 passes through the pipe 22 to be introduced into the intercooler 23. A temperature sensor 24 for detecting a temperature (air temperature) in the pipe 22 is provided to the pipe 22.

The intercooler 23 cools the air introduced into itself to discharge the cooled air to a pipe 25. The pipe 25 is connected to an oxidizer gas inlet of the fuel cell 1. A temperature sensor 26 for detecting a temperature (temperature of the air discharged from the intercooler 23) in the pipe 25 is provided to the pipe 25. The air introduced into the oxidizer gas inlet is diffused to the air electrode 4 through a flow path provided to an air electrode side separator 6. The air having passed through the air electrode 4 is discharged from an oxidizer gas outlet of the fuel cell 1 to the outside.

In FIG. 1, the oxidizer discharge system is configured as follows. A pipe 27 is connected to the oxidizer gas outlet of the fuel cell 1. The pipe 27 is connected to a regulator (back-pressure regulating valve) 28. A pressure sensor 29 for detecting a pressure in the pipe 27 is provided to the pipe 27. By changing an opening of the valve, the regulator 28 regulates a back pressure of the air pump 20. A muffler 31 is connected through a pipe 30 to the regulator 28. The air having passed through the muffler 31 is discharged into the outside air.

The fuel cell system includes an electronic control unit (ECU:computer) 32 as a control system (control means) for controlling the oxidizer supply system and the oxidizer discharge system described above. The ECU 32 includes a processor such as a central processing unit (CPU), a memory (storage device:storage medium) storing a program executed by the processor and data used for the execution of the program, an input/output interface (I/O) with a sensor or the like, and the like.

The ECU 32 receives output signals from the air flow meter 15, the pressure sensor 16, the temperature sensor 17, the concentration sensor 18, the temperature sensor 24, the temperature sensor 26, and the pressure sensor 29. By the execution of the program stored in the memory by the CPU, the ECU 32 controls an operation of the air pump 20, air cooling capacity of the intercooler 23, and the opening of the regulator 28 based on the output signals from the air flow meter 15 and the respective sensors. Further, the ECU 32 uses the output signals from the air flow meter 15 and the concentration sensor 18 to perform lifetime determination processing for the chemical filter 13.

The ECU 32 uses the output signal from the air flow meter 15 and the sensor output signals from the pressure sensor 16 and the temperature sensor 17 to measure an oxidizer gas (air) quantity supplied to the fuel cell. Specifically, the air flow meter 15 feeds an electric signal according to the intake air quantity as an output signal to the ECU 32. The electric signal fed at this time indicates the air quantity under atmospheric pressure and temperature conditions as predefined standards. On the other hand, a density of the air depends on the pressure and the temperature. Therefore, the ECU 32 corrects the air quantity obtained from the air flow meter 15 with a pressure and a temperature received from the pressure sensor 16 and the temperature sensor 17. In this manner, the ECU 32 measures a precise air quantity. The measured air quantity is used for, for example, controlling the air quantity supplied to the fuel cell 1 by the air pump 20.

Moreover, the ECU 32 uses the output signal from the temperature sensor 24 (temperature in the pipe 22) to control the operation of the air pump 20. Specifically, the ECU 32 uses the output signal from the temperature sensor 24 to monitor a temperature of the air discharged (exhausted) from the air pump 20. The temperature of the discharged air equal to or higher than a predetermined value means that an excessive load is imposed on the air pump 20. If such a state continues, there is a possibility that the air pump 20 may be broken. Therefore, when the temperature becomes a predetermined value or higher, the ECU 32 feeds a control signal to the motor 21 to reduce the amount of rotation of the air pump 20 or to stop the operation of the air pump 20.

Moreover, the ECU 32 uses the output signal from the temperature sensor 26 (temperature in the pipe 25) to control the cooling capacity of the intercooler 23. The fuel cell 1 has a predetermined temperature suitable for power generation. When the fuel cell 1 is warmed up beyond necessity by the air supplied to the fuel cell 1, there is a possibility that appropriate power generation of the fuel cell 1 may be inhibited. For example, when the temperature of the air discharged from the intercooler 23 exceeds a predetermined value, the ECU 32 feeds a control signal to the intercooler 23 to enhance the cooling capacity of the intercooler 23 to supply the air having a predetermined temperature or less to the fuel cell 1. For example, when the intercooler 23 is for air cooling, the amount of rotation of a fan provided to the intercooler 23 is increased by the control signal, thereby increasing a flow rate of the cooling air by the fan to promote heat radiation of the air (oxidizer gas) passing through the intercooler 23.

Further, the ECU 32 uses the output signal from the pressure sensor 29 (pressure in the pipe 27) to control the opening (back pressure) of the regulator 28. For example, the ECU 32 monitors the pressure in the pipe 27, which is received from the pressure sensor 29, and feeds the control signal to the regulator 28 to increase its opening when the pressure (back pressure) exceeds a predetermined value (upper limit value), thereby decreasing the back pressure. Alternatively, the ECU 32 feeds the control signal to the regulator 28 to decrease its opening when the pressure becomes less than a predetermined value (lower limit value), thereby increasing the back pressure. The ECU 32 performs the back pressure control as described above according to the amount of power generated by the fuel cell 1 to allow an appropriate operation to be performed.

Next, the lifetime determination processing for the chemical filter 13 in the fuel cell system is described. Based on the air quantity (quantity of air having passed through the adsorber per unit time) obtained from the output signals from the air flow meter 15, the pressure sensor 16, and the temperature sensor 17, a concentration of a specific type of impurity (referred to as an impurity X) in the air of the air intake tube 11 (concentration of the impurity in the air, which enters the adsorber, per unit time), which is obtained by the concentration sensor 18, and a trapping efficiency (adsorption efficiency) of the chemical filter 13, the ECU 32 estimates (calculates) a quantity of the impurity X adsorbed onto the chemical filter 13 per unit time, further obtains a cumulative value of the adsorption quantity, and determines that the chemical filter 13 is at the end of its lifetime (replacement timing) to perform output control of an alarm (corresponding to a "signal" in the present invention) when the cumulative value exceeds a predetermined value.

Figure 2:
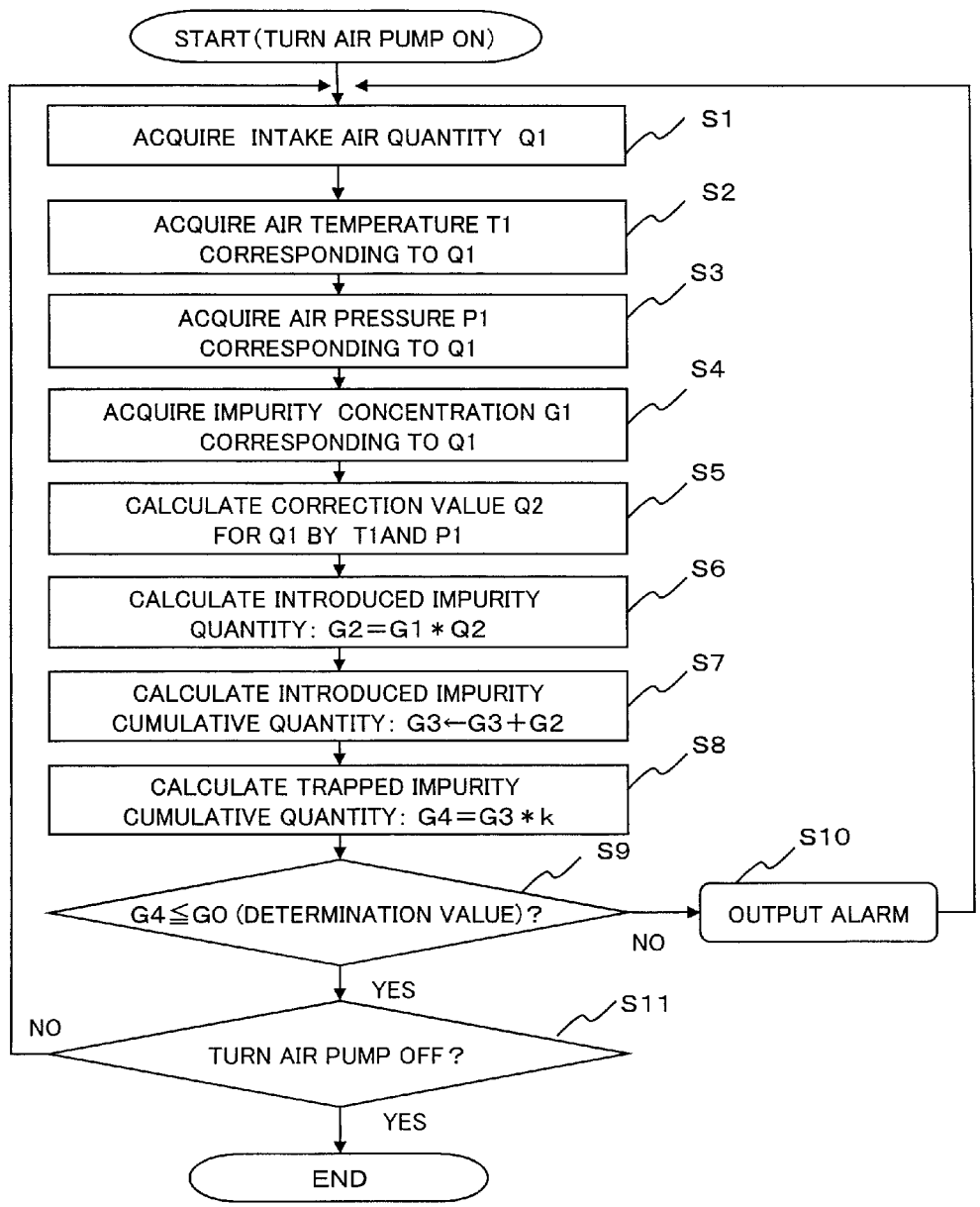
FIG. 2 is a flowchart illustrating an example of lifetime determination processing for a chemical filter by an ECU.

FIG. 2 is a flowchart illustrating an example of the lifetime determination processing for the chemical filter 13, which is realized by the execution of the program in the ECU 32. The processing illustrated in FIG. 2 can be started, for example, upon turn-ON of an operation of the air pump 20. As a precondition in the processing described below, the air quantity, the pressure, the temperature, and the concentration based on the output signals from the air flow meter 15 and the respective sensors 16, 17, and 18 are recorded (accumulated) as air quantity data, pressure data, temperature data, and concentration data in the memory as needed. In steps described below, the ECU 32 reads necessary data from the memory to calculate Q1, T1, P1, and G1 described below in temporal synchronization. Specifically, there is a time lag between the measurement and the recording of the air quantity, the temperature, the pressure, and the concentration and the calculation described in the following steps.

When the processing is started, the ECU 32 loads the output signal of the air flow meter 15 (air flow meter signal:air quantity data) to obtain an intake air quantity per unit time Q1 (Step S1). The intake air quantity Q1 is stored in a work area of the memory included in the ECU 32.

Next, the ECU 32 loads the output signal of the temperature sensor 17 (air temperature signal:temperature data) to obtain a temperature T1 of the air of the intake air quantity Q1 obtained in Step S1 (Step S2). The air temperature T1 is stored in the work area of the memory included in the ECU 32.

Next, the ECU 32 loads the output signal of the pressure sensor 16 (air pressure signal:pressure data) to obtain an air pressure P1 corresponding to a pressure of the air of the intake air quantity Q1 obtained in Step S1 (Step S3). The air pressure P1 is stored in the work area of the memory included in the ECU 32.

Next, the ECU 32 loads the output signal of the concentration sensor 18 (concentration signal:concentration data) to obtain a concentration G1 of the impurity X contained in the air when the air of the intake air quantity Q1 obtained in Step S1 is introduced into the housing container 13A (adsorber) (Step S4). The concentration G1 is stored in the work area of the memory included in the ECU 32. Next, the ECU 32 performs an air flow rate correction calculation (Step S5). Specifically, the ECU 32 calculates an intake air quantity (air flow rate) Q2 obtained by correcting the intake air quantity Q1 stored in the work area with the air temperature T1 and the air pressure P1 stored in the work area and stores the calculated intake air quantity in the work area.

Next, the ECU 32 performs a calculation for an introduced impurity quantity (Step S6). Specifically, the ECU 32 multiplies the intake air quantity Q2 and the concentration G1 stored in the work area to calculate a quantity of the impurity X contained in the air of the intake air quantity Q2, that is, the quantity of the impurity X introduced into the housing container 13A serving as the adsorber and stores the calculated introduced impurity quantity in the work area.

Next, the ECU 32 performs a calculation for an introduced impurity cumulative quantity (Step S7). Specifically, the ECU 32 reads a value of an introduced impurity cumulative quantity G3 stored in the non-volatile memory (storage means) included in the ECU 32, adds the introduced impurity quantity G2 stored in the work area to the value of G3 to calculate a new introduced impurity cumulative quantity G3, and stores the new introduced impurity cumulative quantity G3 in the non-volatile memory (overwrites the value of G3) while storing the new introduced impurity cumulative quantity in the work area.

A configuration is such that zero is set as the value of the introduced impurity cumulative quantity G3 stored in the non-volatile memory when an unused chemical filter 13 is newly set. Each time the processing in Step S7 is executed, the introduced impurity quantity G2 is added to the value of G3. As described above, the introduced impurity cumulative quantity G3 indicates a cumulative value (cumulative quantity) of the quantity of the impurity X introduced into the housing container 13A while the chemical filter 13 is being used.

Next, the ECU 32 performs a calculation for a trapped impurity cumulative quantity (Step S8). Here, the trapping efficiency (adsorption efficiency) by the chemical filter 13 for the impurity X, that is, a rate of the impurity X adsorbed (trapped) by the chemical filter 13 when a certain quantity of the impurity X passes through the housing container 13A is obtained in advance by an experiment or the like. A value k of the trapping efficiency is prestored on the non-volatile memory (storage means) included in the ECU 32. The ECU 32 reads the trapping efficiency k from the non-volatile memory and uses the trapping efficiency as a coefficient to multiply the introduced impurity cumulative quantity G3, thereby calculating a trapped impurity cumulative quantity G4 (quantity of the impurity X adsorbed onto the chemical filter 13) for the introduced impurity cumulative quantity G3 and storing the calculated trapped impurity cumulative quantity in the work area.

Next, the ECU 32 performs filter lifetime determination (Step S9). Specifically, the ECU 32 judges whether or not the trapped impurity cumulative quantity G4 stored in the work area is equal to or less than a predetermined value (determination value G0) pre-stored in the non-volatile memory. The determination value G0 indicates a trapped impurity cumulative value which allows the determination that the chemical filter 13 is at the end of the lifetime which is defined through the experiment or the like.

When the trapped impurity cumulative quantity G4 is equal to or less than the determination value G0 (S9; YES), the processing proceeds to Step S11. On the other hand, when the trapped impurity cumulative quantity G4 exceeds the determination value G0 (S9; NO), the ECU 32 performs alarm output processing (Step S10).

For example, as illustrated in FIG. 1, a warning lamp 33 is connected to the ECU 32. When the trapped impurity cumulative quantity G4 is equal to or less than the determination value G0, the warning lamp 33 is an extinction state. In Step S10, the ECU 32 feeds a lighting signal to the warning lamp 33 to light the warning lamp 33. In this manner, the ECU 32 causes an alarm to be output to enable a user of the fuel cell system (vehicle user) to be informed of the end of the lifetime (replacement timing) of the chemical filter 13.

Once lighted, the warning lamp 33 maintains its lighted state (except for a power-OFF state) until, for example, a special operation such as an extinction switch operation by the user is performed. When Step S10 is terminated, the processing is made to return to Step S1.

On the other hand, when the processing proceeds to Step S11, the ECU 32 judges whether or not the air pump 20 is OFF. When the air pump 20 is ON (S11; NO), the processing returns to Step S1. When the air pump is OFF (S11; YES), the lifetime determination processing is terminated.

According to the fuel cell system according to the first embodiment, the ECU 32 functions as measurement means for measuring the air quantity Q2 having passed through the housing container 13A (adsorber) per unit time (means for obtaining the air quantity Q2). Moreover, the ECU 32 functions as acquisition means for acquiring the concentration G1 of the impurity X in the air when the air of the air quantity Q2 detected by the concentration sensor 18 serving as detection means is introduced into the housing container 13A (adsorber). Further, the ECU 32 functions as estimation means for estimating the quantity of the impurity X adsorbed onto the chemical filter 13 per unit time from the air quantity Q2, the concentration G1, and the trapping efficiency k. Further, the ECU 32 functions as output control means for obtaining the cumulative value (cumulative quantity) of the quantity of the impurity X and causing the alarm to be output to the warning lamp 33 when the cumulative quantity exceeds the predetermined value (determination value G0). As described above, the ECU 32 functions as an adsorption quantity estimating apparatus for estimating the adsorption quantity onto the chemical filter.

As a result, a highly accurate adsorption quantity can be estimated to perform the appropriate determination of the lifetime of the chemical filter 13.

In the processing illustrated in FIG. 2, the order of Steps S1, S2, S3, and S4 is arbitrary. Moreover, the concentration sensor 18 is prepared for each type of the impurity for which the cumulative quantity is to be calculated. However, if a single concentration sensor can be used for a plurality of types of impurities, a configuration is such that the concentrations of the plurality of types of impurities can be detected by the single concentration sensor. The processing illustrated in FIG. 2 can be constructed to be executed in parallel for each type of impurity.

Moreover, a display device may be prepared in place of the warning lamp 33 to display on the display device that the chemical filter is at the end (replacement timing) of the lifetime. In place of or in addition to the warning lamp 33 and the display device, the ECU 32 may cause audio output means such as a warning buzzer to output a sound (alarm sound).

Alternatively, in place of the configuration for replacing the chemical filter 13 according to its lifetime, heating means such as a heater may be provided around the chemical filter 13 and the ECU 32 may control an operation of the heating means to perform heating regeneration processing of the chemical filter 13. In this case, the alarm encourages the heating regeneration processing of the chemical filter 13.

Second Embodiment

Next, a second embodiment of the present invention is described. Since the second embodiment includes points common to the first embodiment, different points are mainly described.

Figure 3:
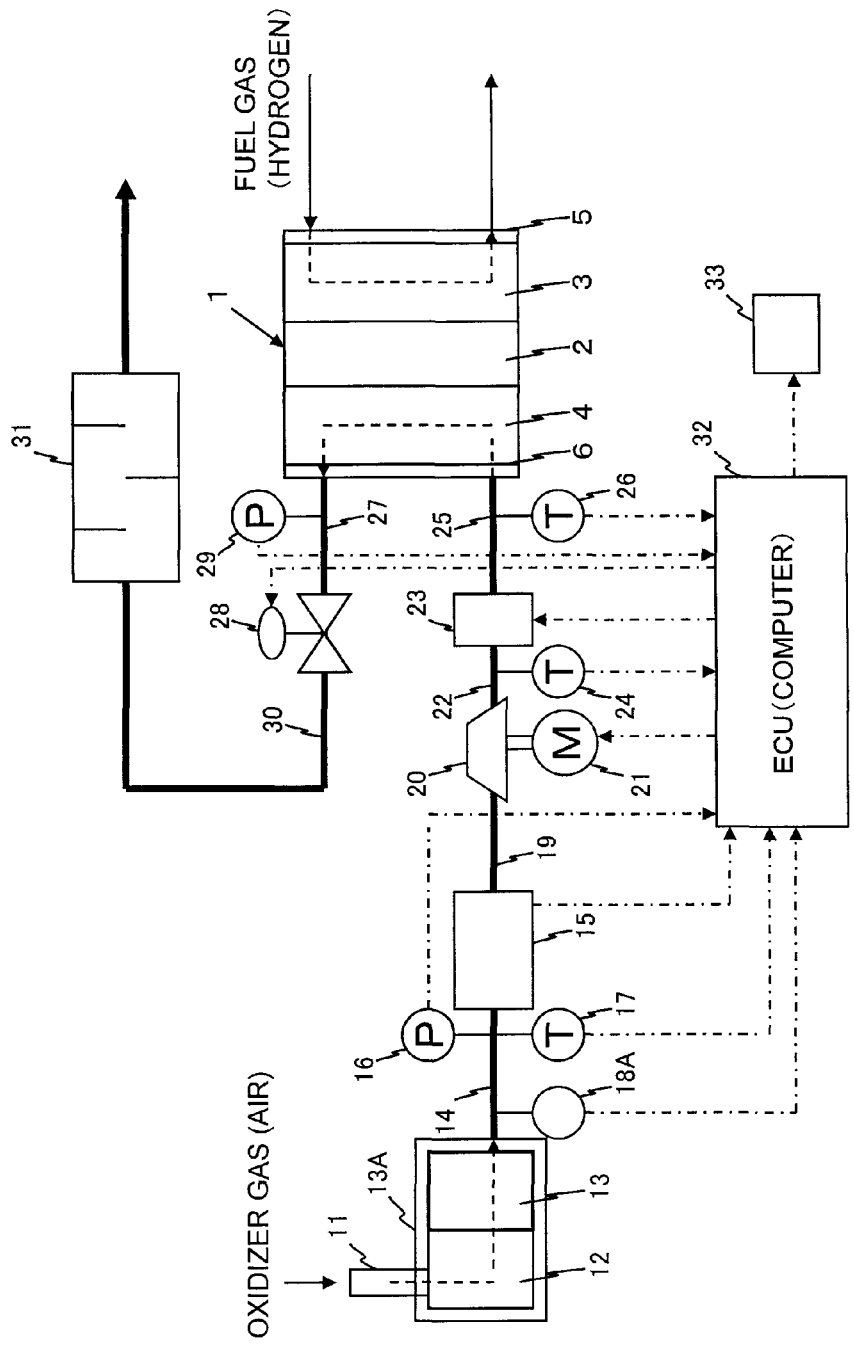
FIG. 3 is an explanatory view illustrating a configuration example of a fuel cell system according to a second embodiment of the present invention.

FIG. 3 is an explanatory view illustrating a configuration example of the fuel cell system according to the second embodiment of the present invention. The fuel cell system illustrated in FIG. 3 is configured such that a concentration sensor 18A is placed not in the air intake tube 11 but in the pipe 14 to detect the concentration of the impurity X in the air discharged from the housing container 13A (having passed through the housing container) to inform the ECU 32 of the detected concentration. Except for the above-mentioned points, the configuration of the fuel cell system is the same as that of the first embodiment. As described below, however, the lifetime determination processing by the ECU 32 is different from that of the first embodiment.

FIG. 4 is a flowchart illustrating an example of the lifetime determination processing for the chemical filter 13 by the ECU 32 in the second embodiment. As in the first embodiment, the air quantity, the pressure, the temperature, and the concentration based on the output signals from the air flow meter 15, the pressure sensor 16, the temperature sensor 17, and the concentration sensor 18A are also accumulated as data on the memory as needed in the processing illustrated in FIG. 4. The ECU 32 executes the processing in each step by using the accumulated data.

In FIG. 4, the processing for measuring the air quantity Q2 in Step S1 to S3 and S5 is the same as that of the first embodiment. In Step S4A, however, the ECU 32 acquires the concentration G1 in the air of the intake air quantity Q1 based on the concentration detected by the concentration sensor 18A serving as detection means.

Moreover, in Step S6A, the ECU 32 calculates the quantity of the impurity X having passed through the housing container 13A serving as the adsorber as a passing impurity quantity G2. A calculation formula itself of G2 is the same as that of the first embodiment. Moreover, in Step S7A, a passing impurity cumulative quantity G3 is calculated in the following manner.

Specifically, the ECU 32 reads a value of the passing impurity cumulative quantity G3 stored in the non-volatile memory included in the ECU 32, adds the passing impurity quantity G2 stored in the work area to the value of G3 to calculate the new passing impurity cumulative quantity G3, and stores the new passing impurity cumulative quantity G3 (overwrites the value of G3) in the non-volatile memory while storing the new passing impurity cumulative quantity in work area.

A configuration is such that zero is set as the value of the passing impurity cumulative quantity G3 stored in the non-volatile memory (storage means) when an unused chemical filter 13 is newly set. Each time the processing in Step S7 is executed, the passing impurity quantity G2 is added to the value of G3. As described above, the passing impurity cumulative quantity G3 indicates a cumulative quantity of the impurity X passing through the chemical filter 13 while the chemical filter 13 is being used.

In Step S8A, the ECU 32 performs a calculation of the trapped impurity cumulative quantity. Here, the trapping efficiency of the chemical filter 13 is obtained in advance by the experiment or the like. From the trapping efficiency, a ratio (M:N) of the quantity of the impurity X adsorbed (trapped) onto the chemical filter 13 (denoted by M) when a certain quantity of the impurity X passes through the housing container 13A (adsorber) to the quantity of the impurity X passing through the housing container 13A without being trapped (denoted by N) is obtained.

On the non-volatile memory (storage means) included in the ECU 32, a value of M when a value of N is, for example, 1 is prestored. The ECU 32 reads the value of M from the non-volatile memory and multiplies the passing impurity cumulative quantity G3 by the value of M (performs a calculation for the ratio) to calculate the trapped impurity cumulative quantity G4 (cumulative quantity of the impurity X adsorbed onto the chemical filter 13) with respect to the passing impurity cumulative quantity G3 and to store the calculated trapped impurity cumulative quantity in the work area.

Since the processing in Step S9, S10, and S11 is the same as that of the first embodiment, the description thereof is herein omitted. In the second embodiment, the ECU 32 functions as the measurement means for measuring the air quantity Q2 having passed through the adsorber (housing container 13A) per unit time and acquiring means for acquiring the concentration G1 of the impurity X in the air of the air quantity Q2 by the concentration sensor 18A serving as the detection means. Further, the ECU 32 functions as estimation means for estimating the quantity of the impurity X adsorbed onto the chemical filter 13 per unit time from the air quantity Q2, the concentration G1, and the trapping efficiency (the value M based on the trapping efficiency). Further, the ECU 32 functions as output control means for obtaining the cumulative value (cumulative quantity) of the quantity of the impurity X and causing the warning lamp 33 to output the alarm (corresponding to the "signal" in the present invention) when the cumulative quantity exceeds the predetermined value (determination value G0). As described above, the ECU 32 functions as the adsorption quantity estimating apparatus for estimating the adsorption quantity onto the chemical filter 13.

As a result, as in the first embodiment, a highly accurate adsorption quantity can be estimated to perform appropriate determination of the lifetime of the chemical filter 13. In the second embodiment, it is apparent that the impurity component can be restrained from affecting the detection accuracy of the sensor because the concentration sensor 18A is provided on the downstream side of the chemical filter 13.

The fuel cell system and the adsorption quantity estimating apparatus according to the present invention are applicable not only to a fuel cell to be mounted in the vehicle but also to a fuel cell to be stationarily placed. Moreover, the type of the fuel cell is not limited to the PEFC.

The invention claimed is:

1. A fuel cell system, comprising:
    an adsorber placed on an air supply path to an air electrode of a fuel cell, the adsorber housing a chemical filter for adsorbing an impurity contained in air;
    a measurement unit configured to measure an air quantity having passed through the adsorber per unit time, comprising a measuring element located downstream of the chemical filter;
    a detection unit to detect a concentration of the impurity contained in air of the air quantity measured by the measurement unit before the air enters the adsorber, wherein the detection unit is located only on an upstream of the chemical filter;
    an estimation unit to estimate a quantity of the impurity adsorbed onto the chemical filter per unit time based on the air quantity, the concentration of the impurity, and an adsorption efficiency of the chemical filter; and
    an output control unit to allow a signal to be output when a cumulative value of the quantity of the impurity exceeds a predetermined value,
    wherein the fuel cell system does not have, on a downstream of the chemical filter, any detection unit to detect a concentration of the impurity contained in air.

2. A fuel cell system according to claim 1, wherein the adsorption efficiency of the chemical filter is a ratio of the impurity adsorbed onto the chemical filter to the impurity passing through the adsorber per unit quantity.

3. A fuel cell system according to claim 1, wherein the fuel cell system is mounted in a vehicle.

4. An adsorption quantity estimating apparatus for a chemical filter in a fuel cell system, comprising:
    a unit configured to acquire an air quantity having passed through an adsorber per unit time, the adsorber being placed on an air supply path to an air electrode of a fuel cell and housing the chemical filter for adsorbing an impurity contained in air, wherein the unit configured to acquire an air quantity comprises a measuring element located downstream of the chemical filter;
    a concentration acquiring unit to acquire a concentration of the impurity contained in air of the air quantity acquired by the air quantity acquiring unit before the air enters the adsorber, wherein the concentration acquiring unit is located only on an upstream of the chemical filter; and an estimation unit to estimate a quantity of the impurity adsorbed onto the chemical filter per unit time based on the air quantity, the concentration of the impurity, and an adsorption efficiency of the chemical filter, the adsorption efficiency being stored in a storage, wherein the adsorption quantity estimating apparatus does not have, on a downstream of the chemical filter, any concentration acquiring unit to acquire a concentration of the impurity contained in air.

5. An adsorption quantity estimating apparatus for a chemical filter in a fuel cell system according to claim 4, wherein the adsorption efficiency of the chemical filter is a ratio of the impurity adsorbed onto the chemical filter to the impurity passing through the adsorber per unit quantity.

6. An adsorption quantity estimating apparatus for a chemical filter in a fuel cell system according to claim 4, wherein the apparatus is mounted in a vehicle.

7. A fuel cell system, comprising:

an adsorber placed on an air supply path to an air electrode of a fuel cell, the adsorber housing a chemical filter for adsorbing an impurity contained in air;

a measurement unit configured to measure an air quantity having passed through the adsorber per unit time, comprising a measuring element located downstream of the chemical filter;

a detection unit to detect a concentration of the impurity contained in air of the air quantity measured in the measurement unit;

an estimation unit to estimate a quantity of the impurity adsorbed onto the chemical filter per unit time based on the air quantity, the concentration of the impurity, and a ratio of the quantity of the impurity adsorbed by the adsorber to the quantity of the impurity passing through the adsorber, the estimation unit being configured to estimate the ratio based on an adsorption efficiency of the chemical filter; and an output control unit to cause a signal to be output when a cumulative value of the quantity of the impurity exceeds a predetermined value.

8. A fuel cell system according to claim 7, wherein the adsorption efficiency of the chemical filter is a ratio of the impurity adsorbed onto the chemical filter to the impurity passing through the adsorber per unit quantity.

9. A fuel cell system according to claim 7, wherein the fuel cell system is mounted in a vehicle.

10. An adsorption quantity estimating apparatus for a chemical filter in a fuel cell system, comprising:

a unit configured to acquire an air quantity having passed through an adsorber per unit time, the adsorber being placed on an air supply path to an air electrode of a fuel cell and housing the chemical filter for adsorbing an impurity contained in air, wherein the unit configured to acquire an air quantity comprises a measuring element located downstream of the chemical filter;

a unit to acquire a concentration of the impurity contained in air of the air quantity acquired by the air quantity acquiring unit; and an estimation unit to estimate a quantity of the impurity adsorbed onto the chemical filter per unit time based on the air quantity, the concentration of the impurity, and a ratio of the quantity of the impurity adsorbed by the adsorber to the quantity of the impurity passing through the adsorber, the estimation unit being configured to estimate the ratio based on an adsorption efficiency of the chemical filter; and the ratio being obtained from an adsorption efficiency of the chemical filter, the adsorption efficiency being stored in a storage.

11. An adsorption quantity estimating apparatus for a chemical filter in a fuel cell system according to claim 10, wherein the adsorption efficiency of the chemical filter is a ratio of the impurity adsorbed onto the chemical filter to the impurity passing through the adsorber per unit quantity.

12. An adsorption quantity estimating apparatus for a chemical filter in a fuel cell system according to claim 10, wherein the apparatus is mounted in a vehicle.

* * * * *